H. A. W. WOOD.
MULTIPLE STEREOTYPE PLATE CASTING MACHINE.
APPLICATION FILED SEPT. 29, 1910. RENEWED OCT. 12, 1917.

1,266,739.

Patented May 21, 1918.
6 SHEETS—SHEET 1.

Fig. 1

Witnesses
Chas. S. Hayes
C. L. Hartnett

Inventor
Henry A. Wise Wood
By Attorneys
Southgate & Southgate

UNITED STATES PATENT OFFICE.

HENRY A. WISE WOOD, OF NEW YORK, N. Y., ASSIGNOR, BY MESNE ASSIGNMENTS, TO WOOD NEWSPAPER MACHINERY CORPORATION, OF NEW YORK, N. Y., A CORPORATION OF VIRGINIA.

MULTIPLE-STEREOTYPE-PLATE-CASTING MACHINE.

1,266,739.     Specification of Letters Patent.     Patented May 21, 1918.

Application filed September 29, 1910, Serial No. 584,488. Renewed October 12, 1917. Serial No. 196,345.

*To all whom it may concern:*

Be it known that I, HENRY A. WISE WOOD, a citizen of the United States, residing at New York, in the county of New York and State of New York, have invented a new and useful Multiple - Stereotype - Plate - Casting Machine, of which the following is a specification.

This invention relates to a machine for casting stereotype printing plates.

The principal objects of the invention are to provide for the rapid production of plates, particularly flat plates, so that a single machine can produce as many plates as a number of the machines now in use; to provide improved means for locking the parts of the casting box in position for casting; to provide improved means for cooling the casting box; to provide for producing a more perfect plate by casting it in such a way that the bubbles of air and gas and impurities will tend to rise to one edge of the plate which has to be trimmed off afterward; to provide means whereby the parts of the casting box will be caused to move in such a way that the plates can be discharged conveniently and the matrices introduced and removed without materially delaying the operation of the machine; to provide improvements in the construction of the pump of such a nature as to permit the pump to move toward and from the casting box so that the entire operation of the casting box can be devoted to the manipulation of the same for the purposes of opening and closing it, receiving and discharging the matrices, and delivering the plates; to provide improved means for controlling the operation of the pump so that metal will not be introduced in the casting box if the matrix is not properly in position; and to provide improvements in details of construction, arrangements of parts, and operating means for the various movable elements as will appear hereinafter.

Reference is to be had to the accompanying drawings in which:

Fig. 2 is an elevation of the same looking in the direction of the arrows 2—2 of Fig. 1 showing some of the parts in section.

Fig. 2$^a$ is a longitudinal vertical section on the line 2$^a$—2$^a$ of Fig. 1:

Fig. 3 is an elevation looking in the direction of the arrow 3 of Fig. 1, with parts in section.

Fig. 3$^a$ is a sectional view on the line 3$^a$—3$^a$ of Fig. 1 showing one-half of the casting box in elevation:

Fig. 3$^b$ is a sectional view on the line 3$^b$—3$^b$ of Fig. 3$^a$:

The operation of casting stereotype printing plates is the one which has been increased in speed to a smaller degree than any of the operations which are required for the production of a newspaper or magazine. This has been due partly to the facts that the cast metal necessarily has to take a certain time in cooling and that the finishing operation must occur after the plate has been sufficiently cooled to stand the action of the trimming and finishing cutters. These difficulties have been supposed to be of such a nature that it was practically impossible to overcome them and most of the inventions in this line have been devoted to improving features which were responsible for only a small percentage of the delay that occurs in this operation. The purpose of this invention is to provide mechanism whereby the stereotyping operation is performed with an increase of speed, but particularly to provide for performing a plurality of stereotyping operations in succession in such a way that while one plate is being cooled, another is being cast and the preceding one is in position to be finished so that the delays which occur in cooling and finishing are utilized for the purpose of performing other operations upon other plates. Similar objects have been attained to a greater or less degree by my own inventions as represented particularly in my patent on machine for making stereotype printing plates, filed January 12, 1910, Serial No. 537,700, granted Dec. 14, 1915.

This invention is designed to secure these results in a much higher degree by the further organization of the machine in such a way as to utilize more of the otherwise wasted time for the purpose of carrying out the steps necessary for the production of the printing plates.

With these objects in view, the particular example of machine shown in the drawings is constructed as follows:—

A frame 20 has an extension 21 at one side of which is located the stationary melting pot 22. In this melting pot as usual is a pump cylinder 23 having a plunger 24 therein. This cylinder is bolted to a seat 25 which constitutes a part of a support 26 mounted to reciprocate on horizontal guides 27 on the extension 21. Also mounted on this frame 26 and movable with it is an arm 28 having a bearing 29 which forms one bearing for an oscillatable shaft 30. The other bearing 31 is fixed on the extension 21. Fixed on this shaft is an arm 32 connected by a link 33 with a spring-pressed lever 34 which has a cam roll 35 operated by a cam 36 on a main cam shaft 37. These connections oscillate the shaft. The shaft is held in position in the bearing 31 by the hub of the lever 32 and a collar 38. Mounted freely on the shaft 30 is a lever 39, pivoted to the rod 40 of the plunger 24 by a link 41. The hub of this lever is held between the bearing 29 and the hub of an arm 42 on the shaft. A clip 43 on the bearing holds these parts so that they reciprocate together on the shaft. The arm 42 is connected with the lever 39 by a pin 44, adapted to break in case of the mechanism meeting with any undue resistance. The hub of the arm 42 has a key and the shaft 30 has a key-way 42ª the whole length so that as the pump reciprocates, the lever will be connected with its shaft at all times. In this way it will be seen that the pump is connected with the power in all positions of the reciprocating support on which it is mounted.

As in my above mentioned patent a valve 45 is used for automatically opening and rendering the pump inoperative when the casting boxes close without a matrix in proper position. This valve has a rod 45', adapted to be governed in operation as in said patent by hooks 46 on a rod 47 which is oscillatable in bearings 48 movable with the pump. On the end of the rod is a finger 49 having a slanting edge, the operation of which will be described hereinafter.

The reciprocation of the pump support 26 is caused in the following manner: The cylinder is connected by a tubular member 50 with a nozzle 51. At a point near the discharge end of the tubular member 50 is a stud 52 to which a toggle 53 is connected. The other member of the toggle is pivoted to a stationary cross-piece 54 on the extension 21. This part of the toggle is fixedly connected with an arm 55 which is connected with a link 56, which by means of a lever or double arm connection 57, is operated by a rod 58 having a cam roller 59 operating by a cam 60 mounted on the shaft 37. It will be seen that when this cam operates to break the toggle, the pump frame will be drawn forward.

The nozzle of the pump is constructed in such a way as to deliver the metal in a vertical sheet to a casting box located to receive it and having a vertical mold space therein. In this way the bubbles or any particles of dross or other light matter will rise in the mold to an edge thereof, instead of being left in the body of the casting. In this way the danger of making bad plates is reduced, as will be understood readily when it is considered that the plates are very thin and a single bubble of air or gas caught between the two surfaces of a plate will necessarily materially weaken the plate and sometimes cause a perforation or a depression on the face of the plate. For this purpose the nozzle is extended upwardly from the connection 50 and is provided with an outlet, slot or nozzle proper 62 in vertical position and of a height substantially equal to the width or length of a plate to be cast. Back of this nozzle is a vertical enlargement 63 adapted to hold a quantity of metal and keep it in molten condition under ordinary circumstances. One wall of the slot 62 is made removable by forming it of a block 64 which is fastened in position by a screw or bolt 65. In this way it can be removed and replaced both for repairs and for cleaning the parts from adhering metal and other matter.

In this block and also in the wall of the nozzle on opposite sides of the slot 62 are vertical perforations 66 through which air is adapted to circulate. In view of the fact that this part of the device is heated to a high degree and the fact that these perforations are vertical, it will be seen that a draft of air will be induced to move upwardly through these perforations to cool the metal retained in the slot 62.

The mold or casting box consists of two mold elements 70 and 71. Each mold element is formed with a plurality of sides preferably the same number. Each is shown as having four flat sides or casting surfaces. The mold element 70 may be considered as constituting the back and has gages 68 on each side for closing the sides of the mold and holding the cast plates, and the mold element 71, which may be considered as the core, has side gages 69 for holding the matrices, substantially as shown in my above mentioned patent. The mold element 70 is mounted to rotate on trunnions 72 but not to move laterally. The mold element 71 also is mounted on trunnions 73, but, instead of being located in fixed bearings, their journal bearings 74 are mounted to slide in guides 74′ and are connected by links 75 with a wide arm 76. The links 75 and arm 76 are connected by an eccentric rod 77 having pin holes 78 by which it may be adjusted so as to vary the stroke of the mold element 71. The arm 76 is mounted on a shaft 79 which is provided with a gear or pinion 80 meshing with a gear segment 81 on an arm 82 which is provided with a cam roller 83 that engages a cam 84, mounted on the shaft 37. This mechanism provides for reciprocating the mold element 71.

The rotation of the two mold elements is accomplished in the following manner. On the shaft 37 is a cam 85 which operates a cam roller 86 on a bell crank 87. This bell crank is connected by a link 88 with a rack 89 which reciprocates in a guide 90. Also on the shaft 37 is a cam 91 which operates a cam roller 92 operating a fork 93 on a rod 94. This rod operates a lever 95 and link 96 which is connected with another sliding rack 97. This rack also is mounted to slide in the guide 90. These two racks operate pinions 98 and 99, respectively, on the trunnions of the two mold elements. The guide 90 is supported by links 100 depending freely from above. This guide also is adapted to move and is operated by a cam 101 (on the shaft 37), cam roll 102, lever 103, and link 104. The stationary frame 20 is provided with stationary guides 105 and 106 having tapering mouths for receiving and accurately guiding the reciprocating mold element 71. Between these guides it is supported by the guides 74′. The other mold element 70 is adapted to be held or locked in proper position for casting by a pivoted clamp 110 which is worked by a cam 111 on the shaft 37, cam roll 112, fork 113 on a rod 114, lever 115, and link 116. The clamp has two arms to engage the top and bottom of the mold element. The parts also are held firmly in position during casting by the pressure of the cam which reciprocates the pump.

Figure 1:
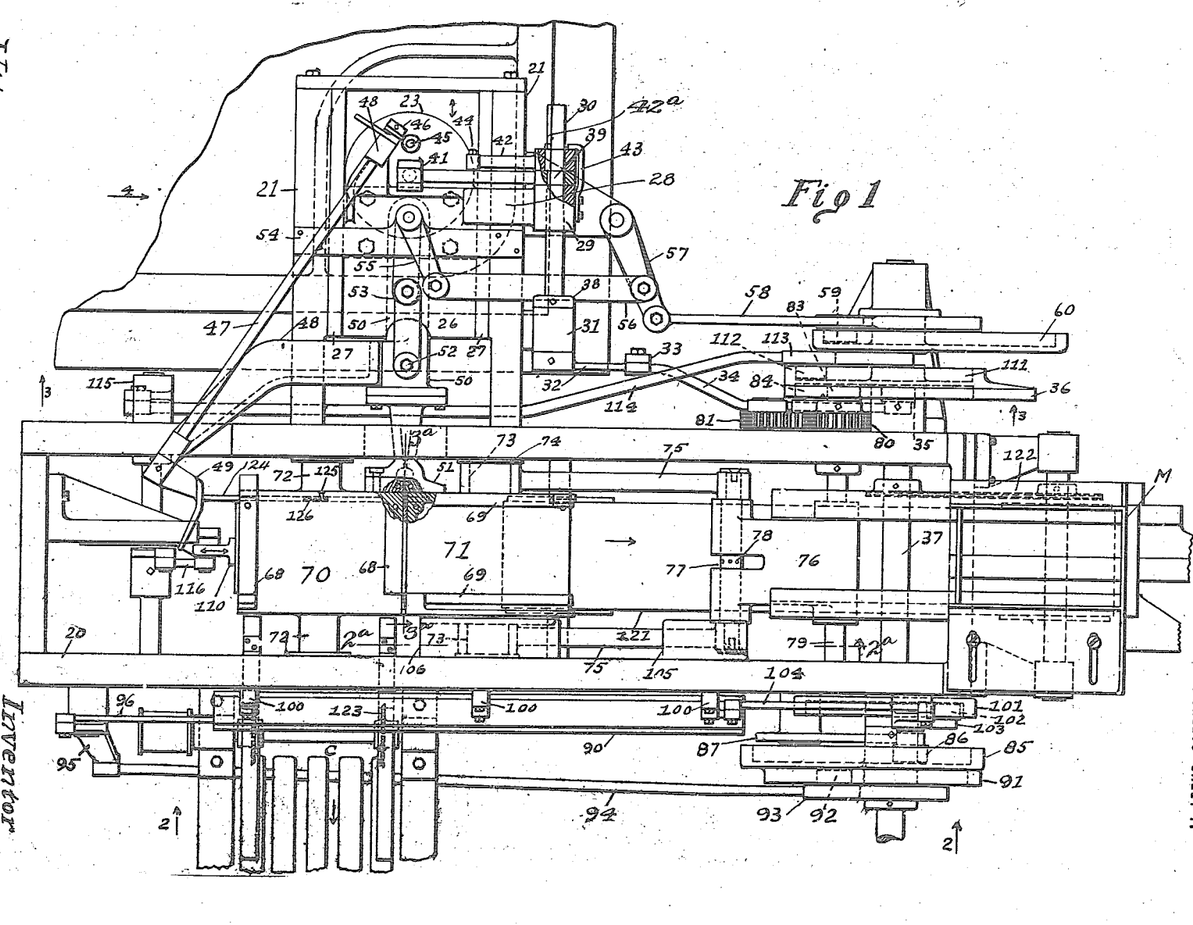
Figure 1 is a plan of a machine for casting flat stereotype plates constructed in accordance with this invention.
Figures 2, 2A:
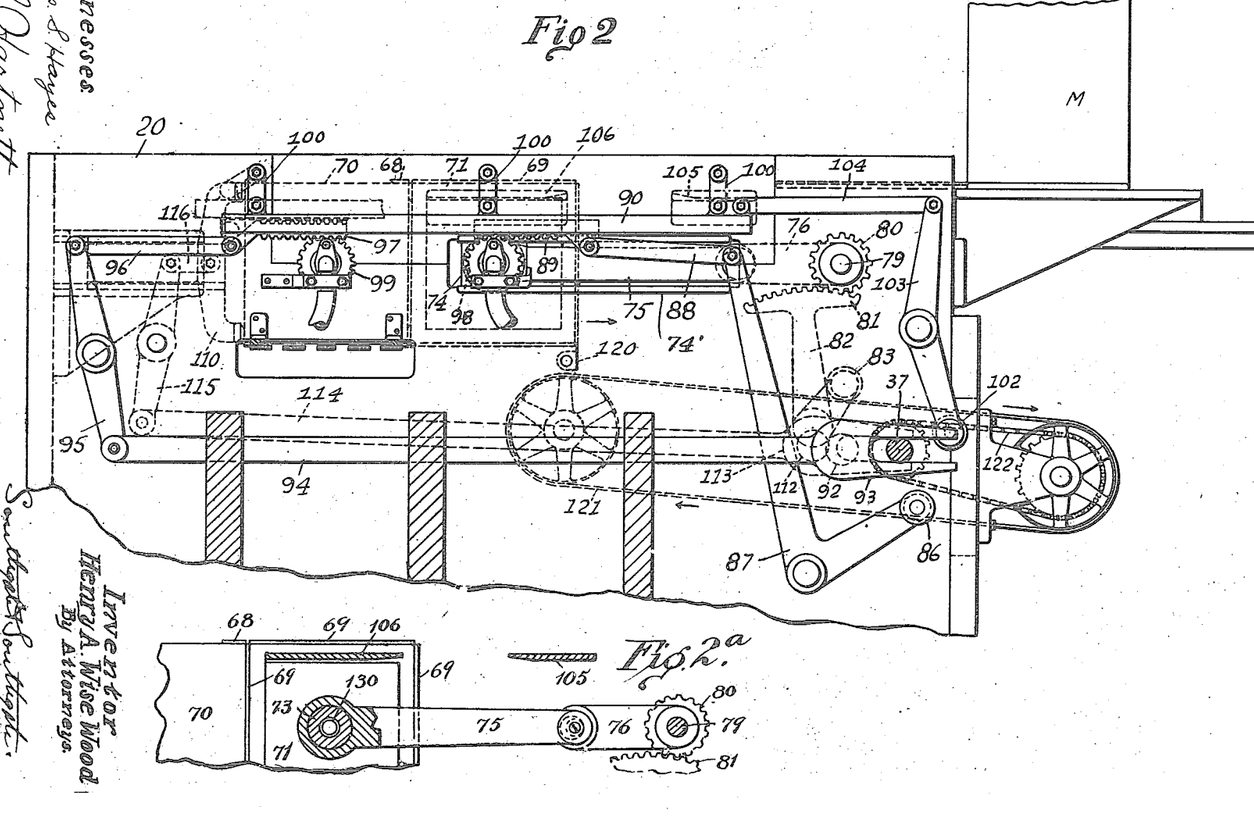
Figures 3, 3A, 3B:
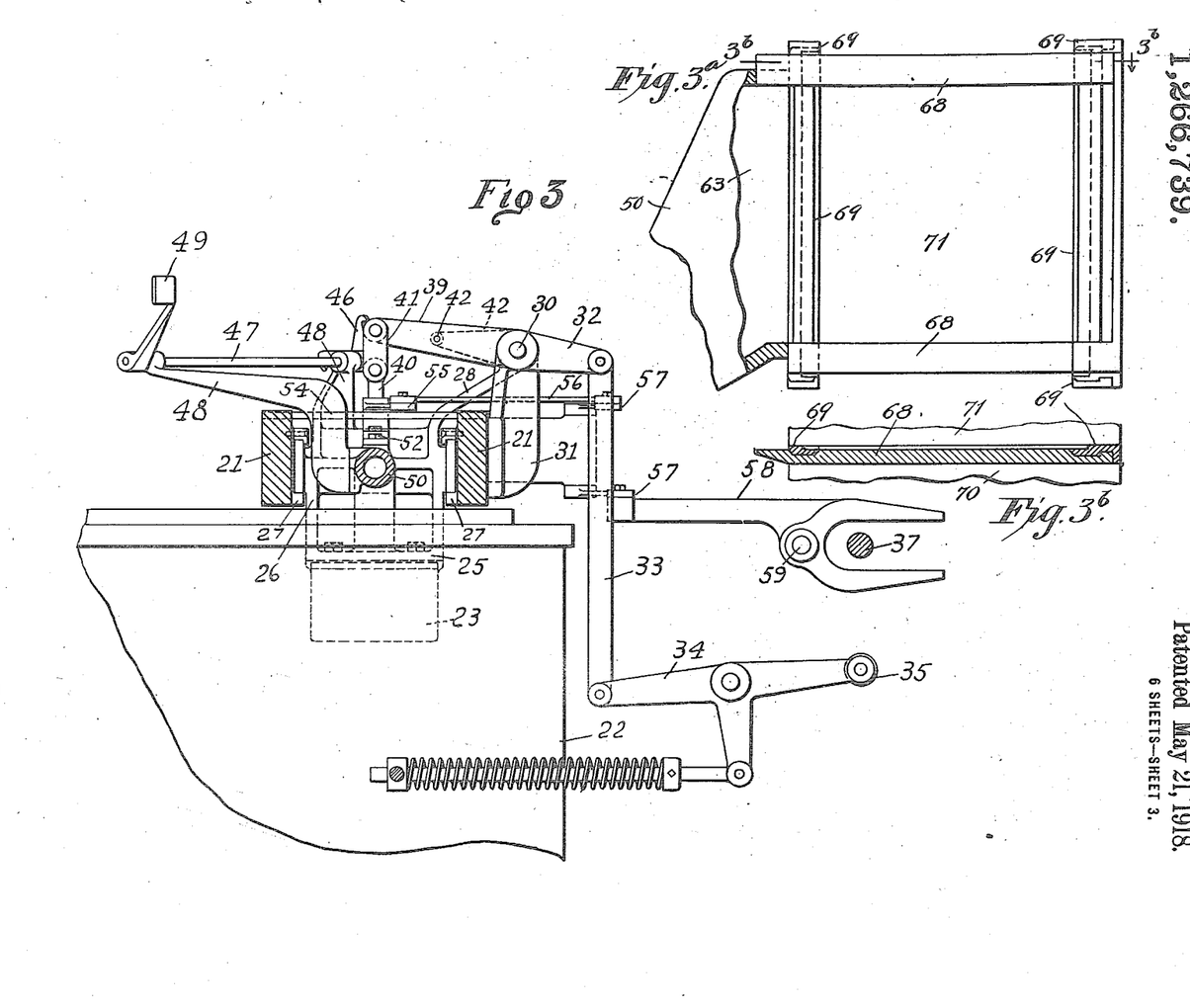
Figure 4:
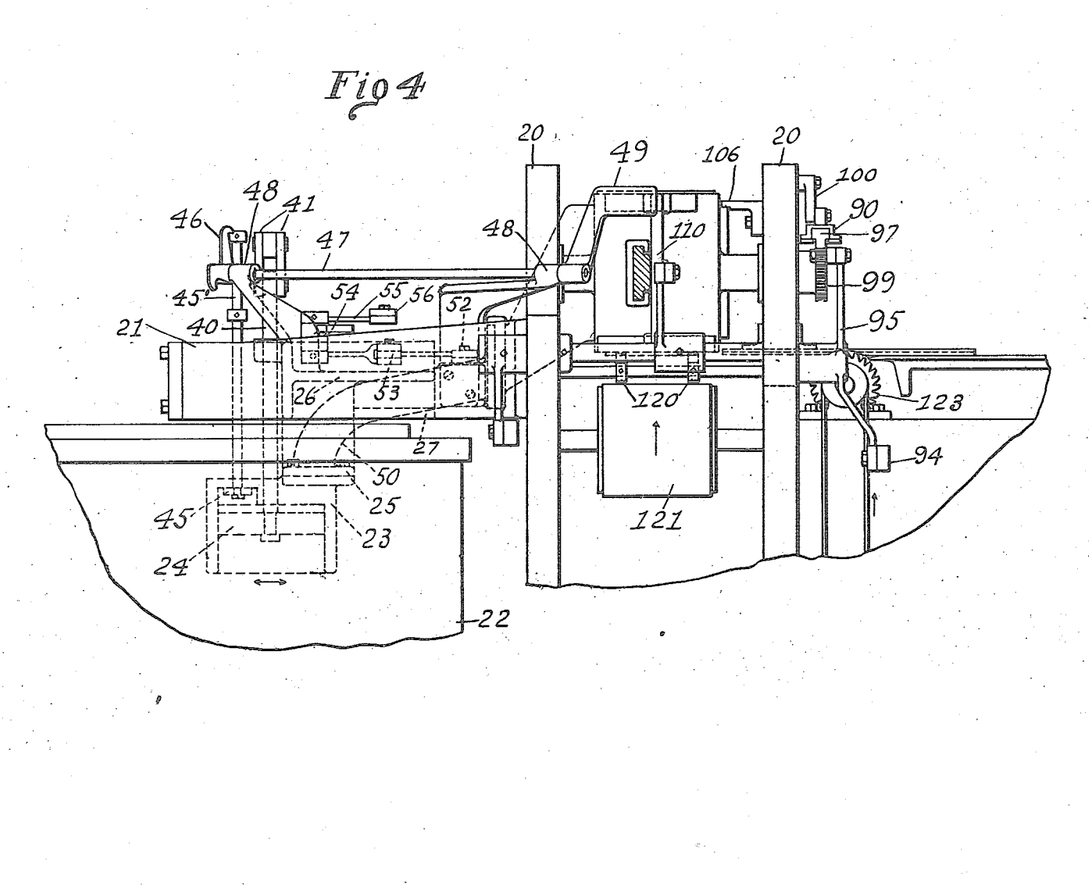
Fig. 4 is a side view of the machine looking in the direction of the arrow 4 in Fig. 1.
Figures 5, 6:
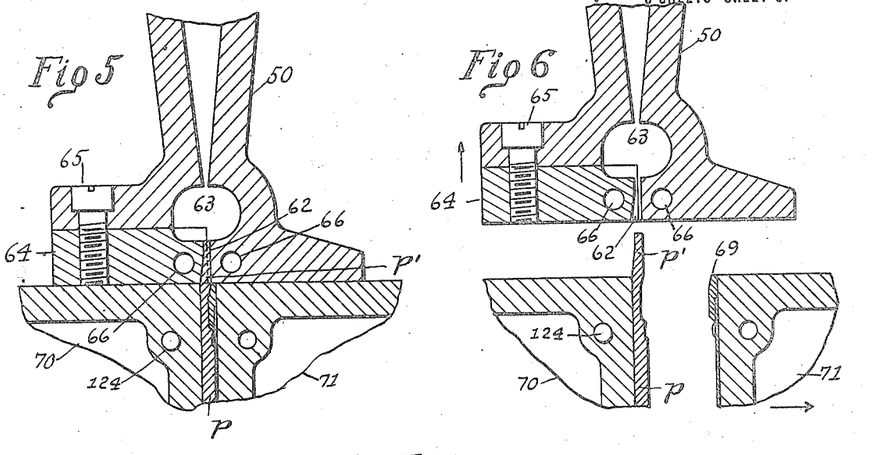
Fig. 5 is a horizontal sectional view showing the nozzle of the pump and a portion of the mold on an enlarged scale, in position for casting.
Fig. 6 is a similar view showing the parts after they have separated.
Figure 9:
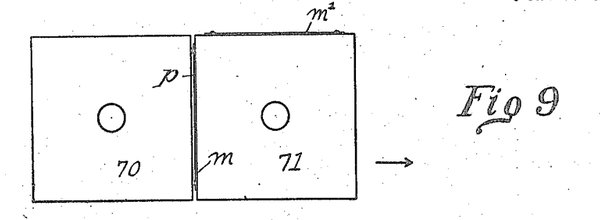
Figs. 9, 10, 11, 12 and 13 are diagrammatic side elevations showing the different positions of the boxes during a cycle of operations.
Figure 10:
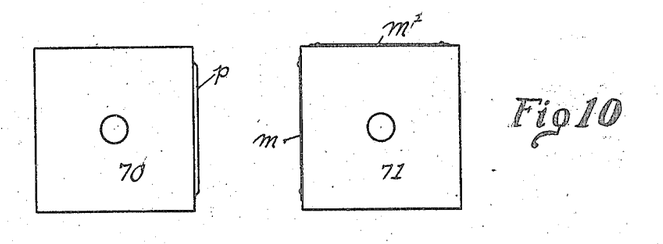
Figure 11:
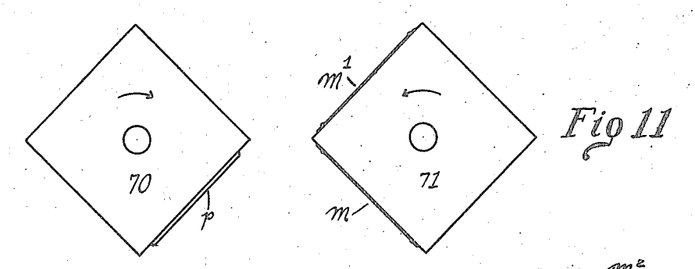

The operation of these parts is as follows, reference being had particularly to the diagrammatic views, Figs. 9–13, inclusive. Fig. 9 shows the two mold elements in casting position with a matrix $m$ located on one of the surfaces of the movable mold element 71, and between the two mold elements, a plate $p$ cast thereon, and a second matrix $m'$ on another surface of the mold element 71. The mold is opened by the straight reciprocation of the mold element 71 away from the mold element 70, leaving the cast plate $p$ upon the latter. This motion is accomplished by the operation of the segment 81 and connected parts, as hereinbefore described. While the slide on which this mold element is mounted moves straight back, the rack 89 is caused to move back with it at the same speed so that the mold element does not turn. As the slide continues to move back, however, the rack 89 is held in stationary position on account of the shape of the cam 85 which operates it. This causes the mold element to turn as indicated in Fig. 11 until it completes a quarter turn. This brings the matrix $m$ to the bottom, and the matrix $m'$ into vertical position between the two mold elements. At the same time the rack 97 is being operated to turn the mold element 70 a quarter turn to bring the cast plate at the bottom. After the quarter turn is completed the rack 89 continues to move back with the pinion 98 until the mold element 71 comes to the position shown in Fig. 12, which is the starting point. It is at this point that the rack arrives at the end of the stroke. When the mold element 71 is in the two positions shown in Figs. 10 and 12, it is guided by the two fixed guides 106 and 105, respectively, but while it is turning between these two positions, it is of course out of contact with the guides. When the parts are in the extreme position at the end of the stroke the cam 101 comes to its high point and swings the guide 90 bodily up above the position shown in Fig. 2. While this guide is in this position the racks 89 and 97 which are supported by it are out of mesh with their two pinions 98 and 99 and the segment 81 moves back through the other part of its stroke and takes the mold element 71 straight back to the position shown in Fig. 13 without turning it. The mold element 70 is of course stationary during this period.

Figure 12:
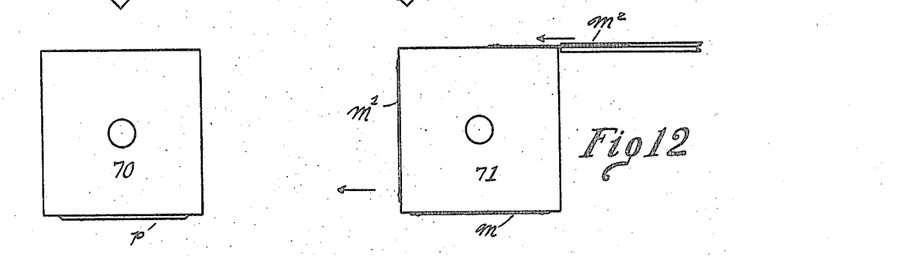

When the mold element 71 is in its extreme position shown in Fig. 12, another matrix $m^2$ is introduced into it from a matrix delivery mechanism M which is not herein shown and described in detail as the form illustrated in my above mentioned patent can be employed.

It will be seen, therefore, that at this time this mold element 71 is provided with three matrices $m$, $m'$ and $m^2$. Now as it starts to move back to the position shown in Fig. 13, the first matrix $m$ which has just been used to produce the plate $p$ comes into contact with a stripper 120 which is stationary at this time and causes the matrix to be removed from the mold element as the latter passes over it toward the position shown in Fig. 13. The matrix is delivered on a conveyer 121 which takes it back out of the machine. This is operated by an endless chain 122 operated from the shaft 37. The plate $p$ also is removed from the mold element by a carrier C which is not shown herein in detail, as the same form can be used as that shown in my above mentioned patent. This occurs when the mold elements are separated, as shown in Fig. 12, and the plate is moved out in position to be operated upon by any desired kind of finishing device not herein shown in detail. The only part of the finishing device illustrated is a pair of trimming saws 123. The plate $p$ has a sprue $p'$ as cast.

Figure 13:
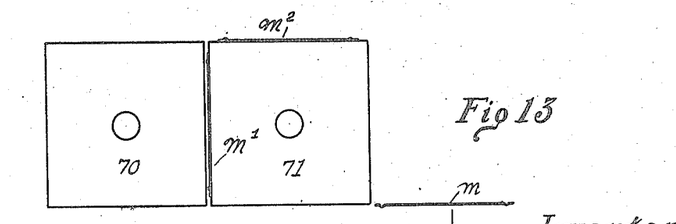

When the parts come back together to the position shown in Fig. 13 the guide 90 comes back into its lowermost position so that the racks engage their pinions and the parts are operated to commence another cycle of operations, the metal being introduced of course at this point.

The operation as described is the ordinary operation taking place when the parts are set up as hereinbefore described. It will be understood, however, that this operation can be varied within wide limits. For example, if it is desired to cast more than one plate from each matrix the parts can be disconnected in any desired way so as to prevent the operation of the stripper 120 and of the matrix magazine M. This can be done simply by turning the stripper out of the way on its axis and by disconnecting the operating connections of the matrix magazine, as shown in my above mentioned patent. In this case the four matrices already on the mold element 71 will operate to produce four plates in succession until these connections are restored.

Figure 7:
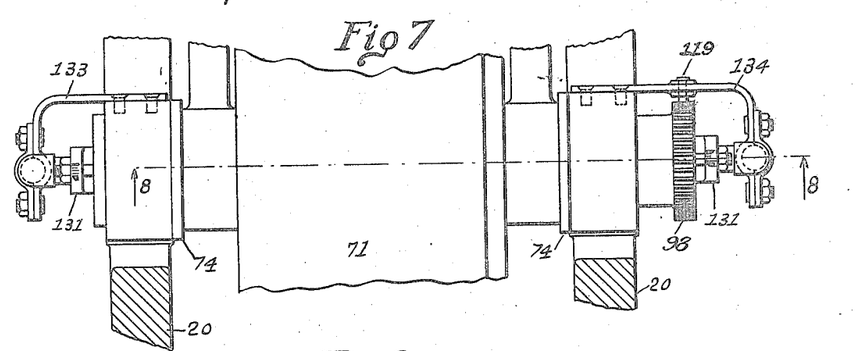
Fig. 7 is a plan looking in the direction of the arrows 7—7 of Fig. 8 of a portion of one of the casting boxes and its bearings showing one form of cooling arrangement.
Figure 8:
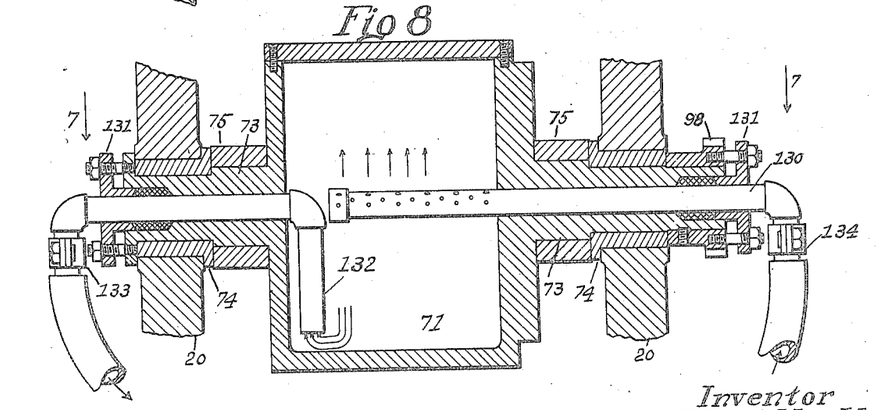
Fig. 8 is a sectional view of the same on the line 8—8 of Fig. 7 looking in the direction of the arrows.

If it is desired to produce only a single product, matrices will be used which are all alike, but different matrices of course can be employed on the different sides of the box 71 if desired. If it is desired to produce continuously from a single matrix on one of the faces of the mold element 71 the mechanism for turning this mold element is thrown out of operation, as by disconnecting the bell-crank 87 from the link 88. The guide 90 would of course continue to operate so as properly to control the rotation of the mold element 70. In this case a pin 119 (Fig. 7) preferably is used to engage the pinion 98 and positively prevent turning motion of mold element 71. It will be seen that the machine is capable of a wide variety of operations.

The mold element 70 is provided with matrix registering pins 124, one for each matrix. Each of these pins is held in position by a screw 125 engaging a recess 126 and they are free to move. When a matrix is placed in position and the mold elements come up together and close, the matrix, if properly placed, will engage its pin 124 and force it out. Then when the pump moves up to casting position, the end of this pin will be engaged by the finger 49 fixed on the rod 47. This results in holding the valve 45 closed. If the matrix is not properly positioned this operation does not take place and the valve is left open so as to permit the piston 24 to reciprocate without introducing any metal into the casting box.

Each mold element is cooled during the casting operation by means of a water conducting pipe 130 passing longitudinally through the center of one of the trunnions and held by a stuffing box 131. This pipe is perforated inside so as to spray the water on the inside of the mold element. The water is removed by a siphon 132 which passes through the other trunnion and through a corresponding stuffing box 131. Both pipes 130 and 132 are held from turning by brackets 133 and 134 each fixed to the pipe, and one fixed to frame 20 and the other to the sliding journal bearing 74 with which the movable trunnion slides.

While I have illustrated and described a preferred embodiment of the invention and shown it applied to the manufacture of flat stereotype printing plates, I am aware that the invention can be carried out in many ways and that it is capable of use for casting other articles of a similar nature. Therefore, I do not wish to be limited to all the details of construction herein shown and described, or to the particular form of plate illustrated, but what I do claim is:—

1. As an article of manufacture, a stereotype plate casting mold having a vertical mold space for forming a plate, and a vertically disposed pouring slot or mouth communicating with the vertical mold space substantially throughout the extent of the height thereof, and provided with an enlarged space at the base thereof for holding a quantity of metal.

2. As an article of manufacture, a casting mold having a vertical mold space, and a vertically disposed pouring slot or mouth in one edge thereof communicating directly with said space.

3. As an article of manufacture, a stereotype plate casting mold comprising two parts each having a vertical flat face, said flat faces being adapted to register with each other to form a complete mold space and provided at one edge of said mold space with a vertically disposed pouring slot or mouth extending the entire height of said mold space.

4. As an article of manufacture, a stereotype plate casting mold having a vertical mold space for forming a plate, and a vertically disposed pouring slot or mouth provided with a transversely enlarged space along the base thereof parallel with the edge of the mold space for holding a quantity of metal.

5. As an article of manufacture, a mold having a space for casting a thin plate, a pouring slot at one edge communicating directly with said mold space substantially throughout the length thereof, and a transversely enlarged space adjacent to the mold space extending along said pouring slot parallel with the edge of the mold space for holding a body of metal in molten condition during the solidification of the casting.

6. As an article of manufacture, a mold having a thin mold space for casting a thin plate, a pouring slot communicating with said mold space, and a transversely enlarged space adjacent to the mold space for holding a body of metal in molten condition during the solidification of the casting.

7. In a stereotype plate casting device, the combination of a back having a plurality of casting faces, with a core coöperating therewith and having a plurality of casting faces.

8. In a stereotype plate casting device, the combination of a back having a plurality of casting faces, with a core coöperating therewith and having a plurality of casting faces, said core and back being rotatable on different axes.

9. In a casting device, the combination with a pair of mold elements arranged side by side and each rotatable on its own axis, each having a plurality of sides adapted to coöperate with the sides of the other.

10. In a stereotype plate casting device, the combination of a back having a plurality of casting faces, and means for holding a matrix on each of said faces, with a core coöperating with said back and having a plurality of casting faces, and means for holding a plate on each of the faces of the core.

11. In a casting device, the combination of a pair of rotatable mold elements, each having a plurality of sides, the sides of one mold element being adapted to receive matrices, and the sides of the other mold element having means for holding cast plates thereon.

12. In a casting device, the combination with a pair of mold elements arranged side by side and each rotatable on its own axis, each having a plurality of sides adapted to coöperate with the sides of the other, the sides of one mold element being adapted to receive matrices, and the sides of the other mold element having means for holding cast plates thereon.

13. In a device of the character described, the combination with a movable mold adapted to receive a matrix when in one position, and means for delivering the matrix from the mold element when said mold element is in another position.

14. In a stereotype plate casting device, the combination with a mold element adapted to turn on a central axis and adapted to receive a matrix when in one position, of means for delivering the matrix therefrom when the mold element is in another position relative to said axis.

15. In a stereotype plate casting device, the combination with a mold element adapted to turn on a central axis and adapted to receive a matrix when in one position, of means for delivering the matrix therefrom when the mold is in another position relative to said axis less than 180° from the receiving position.

16. In a device of the character described, the combination with a rotatable mold element having a plurality of mold faces thereon and adapted to receive a matrix on each face in turn when said faces are in a certain position, means for turning the mold element on its axis, and means for delivering the matrices from said faces after they are turned from said position.

17. In a device of the character described, the combination with a mold element having a plurality of faces, each having means for holding a matrix, of means for intermittently rotating said element, means for delivering a matrix on each of said faces when in horizontal position, means for casting a plate against each matrix while in vertical position, and means for thereafter removing the matrices from said element when they are again in horizontal position.

18. In a stereotype plate casting apparatus, the combination with a movable mold having a flat mold space, of means for casting a plate therein in vertical position, means for turning the mold, and means for ejecting the matrix in a horizontal position.

19. In a casting machine, the combination with a pair of mold elements, both mounted to rotate on parallel axes at a distance apart, means for withdrawing one mold element from the other, and means for then rotating each mold element through a portion of a revolution.

20. In a casting machine, the combination with a pair of mold elements each having a plurality of sides, means for separating said mold elements after a casting is made between them, and means for thereafter turning each mold element through a part of a revolution to bring fresh sides opposite each other.

21. In a machine of the character described, the combination with a pair of mold elements, each having a plurality of sides, one of said mold elements being adapted to receive matrices on its different sides, means for bringing said mold elements together to form a mold for casting a printing plate between them and for separating the mold elements thereafter, and means for then turning the mold element having the matrices thereon to bring another matrix into position opposite the other mold element.

22. In a machine of the character described, the combination with a pair of mold elements, each having a plurality of sides, one of said mold elements being adapted to receive matrices on its different sides, means for bringing said mold elements together to form a mold for casting a printing plate between them and for separating the mold element thereafter, means for then turning the mold element having the matrices thereon to bring another matrix into position opposite the other mold element, means for then bringing the mold elements together to cast another plate, and means for stripping the first matrix from the mold element as it is moving toward casting position.

23. In a machine of the character described, the combination with a pair of mold elements, each having a plurality of sides, one of said mold elements being adapted to receive matrices on its different sides, means for bringing said mold elements together to form a mold for casting a printing plate between them and for separating the mold elements thereafter, means for then turning the mold element having the matrices thereon, to bring another matrix into position opposite the other mold element, and means for supplying a new matrix to said mold element before it is moved into its casting position the second time.

24. In a machine of the character described, the combination of a pair of mold elements adapted to cast a printing plate, one of said mold elements having a plurality of sides, each side being adapted to receive a matrix, means for supplying a matrix to one side of said mold element, means for thereafter turning the mold element to bring said matrix into position parallel with the adjacent side of the other mold element, and means for then bringing the mold elements together.

25. In a machine of the character described, the combination of a pair of mold elements adapted to cast a printing plate, one of said mold elements having a plurality of sides, each side being adapted to receive a matrix, means for supplying a matrix to one side of said mold element, means for thereafter turning the mold element to bring said matrix into position parallel with the adjacent side of the other mold element, means for then bringing the mold elements together, means for separating the mold elements after a casting is made and bringing the matrix holding mold element to receive a new matrix on another side, and means for stripping the used matrix therefrom.

26. In a machine of the character described, the combination with a pair of mold elements, each having a plurality of sides, one of said mold elements being adapted to receive matrices on its different sides, means for bringing said mold elements together to form a mold between them and for separating the mold elements thereafter, means for then turning the mold element having the matrices thereon to bring another matrix into position opposite the other mold element, whereby the mold elements can then be brought together to cast another plate, means for stripping the first matrix as the mold element carrying it is moving, and a conveyer in position for receiving the matrices.

27. In a machine of the character described, the combination with a pair of mold elements, each having a plurality of sides, one of said mold elements being adapted to receive matrices on its different sides, means for bringing said mold elements together to form a mold between them, means for stripping a matrix from one mold element as it is moving, and a conveyer in position for receiving the matrices.

28. In a machine of the character described, the combination of a pair of mold elements mounted to turn on axes, each having a plurality of sides, the sides of one mold element being adapted to receive matrices, and the sides of the other mold element having gages for holding a cast plate thereon after the mold elements are separated, means for separating said mold elements, and means for giving both mold elements a turn on their axes after they are separated to bring the next two sides into position to come together when the mold elements again approach each other.

29. In a machine of the character described, the combination of a pair of mold elements, each having a plurality of sides, the sides of one mold element being adapted to receive matrices, and the sides of the other mold element having means for holding a cast plate thereon after the mold elements are separated, means for separating said mold elements, means for giving both mold elements a turn on their axes after they are separated to bring the next two sides into position to come together when the mold elements again approach each other, and means for stripping the used matrix from one of the mold elements while they are separated.

30. In a machine of the character described, the combination of a pair of mold elements, each having a plurality of sides, all the sides of one mold element being adapted to receive matrices, and all the sides of the other mold element having gages for holding a cast plate thereon after the mold elements are separated, means for separating said mold elements, means for giving both mold elements a turn on their axes after they are separated to bring the next two sides into position to come together when the mold elements again approach each other, means for stripping the used matrix from one of the mold elements while they are separated, and means for discharging the cast plate from the other mold element while they are separated.

31. In a machine of the character described, the combination of a pair of mold elements, each having a plurality of sides, all the sides of one mold element being adapted to receive matrices, and all the sides of the other mold element having means for holding a cast plate thereon after the mold elements are separated, means for separating said mold elements, means for giving both mold elements a turn on their axes after they are separated to bring the next two sides into position to come together when the mold elements approach each other, and means for discharging the cast plate from the other mold element while they are separated.

32. In a machine of the character described, the combination of a pair of mold elements, one of said mold elements having means for receiving a matrix thereon and the other having means for retaining a cast plate thereon, means for moving said mold elements into contact with each other to produce a space for receiving casting metal and for thereafter separating said mold elements, and means for turning the mold element having the matrix thereon on an axis to bring the matrix into position to be removed.

33. In a machine of the character described, the combination of a pair of mold elements, one of said mold elements having means for receiving a matrix thereon and the other having means for retaining a cast plate thereon, means for moving said mold elements into contact with each other to produce a space for receiving casting metal and for thereafter separating said mold elements, means for turning the mold element having the matrix thereon on an axis to bring the matrix into position to be removed, and means for turning the other mold element on an axis, to bring the cast plate into position to be discharged.

34. In a machine of the character described, the combination of a pair of mold elements, each having a plurality of sides, the sides of one mold element being arranged and adapted to receive matrices, and the sides of the other mold element having means for holding cast plates on their respective sides after the mold elements are separated, both mold elements being capable of turning on their axes when separated to bring the next two sides into position for casting when the mold elements are again brought together.

35. In a machine of the character described, the combination of a pair of mold elements, one of said mold elements having means for receiving a matrix thereon and the other having means for retaining a cast plate thereon, means for moving said mold elements into contact with each other to produce a space for receiving casting metal and for thereafter separating said mold elements, whereby the matrix will be withdrawn from the cast plate and the cast plate will be left on one of the mold elements, means for turning the mold element having the matrix thereon on an axis to bring the matrix into position to be removed, and means for supplying a new matrix to said movable mold element.

36. In a casting machine, the combination of a pair of rotatable mold elements, means for bringing one mold element up into contact with the other, a gear on each mold element, a rack for operating each gear, and means for simultaneously operating said racks to rotate said mold elements on their axes.

37. In a casting machine, the combination of a mold comprising two mold elements, one of said casting mold elements being reciprocable toward and from the other, the other mold element being rotatable on an axis, a gear on the rotatable mold element, a rack meshing with said gear, a movable support for said rack, means for reciprocating said rack to turn the gear, and means for moving the support and rack away from the gear.

38. In a casting machine, the combination of a mold consisting of two mold elements, means for reciprocating one of said mold elements toward and from the other, the other mold element having trunnions, a gear concentric with said trunnions, a rack adapted to mesh with said gear, means for swinging said rack out of mesh with the gear and back into mesh therewith, and means for reciprocating the rack in one direction while in mesh with the gear and in the other direction while out of mesh, whereby at each operation said mold element will be rotated a part of a revolution and always in the same direction.

39. In a casting machine, the combination of a mold consisting of two mold elements, means for reciprocating one of said mold elements toward and from the other, the other mold element having trunnions, a gear concentric with said trunnions, a rack adapted to mesh with said gear, a support for the rack, links pivoted beyond the rack, means for swinging said rack on the links to bring the rack out of mesh with the gear and back into mesh therewith, and means for reciprocating the rack in one direction while in mesh with the gear and in the other direction while out of mesh, whereby at each operation said mold element will be rotated a part of a revolution and always in the same direction.

40. In a casting machine, the combination of a pair of mold elements, each mold element being mounted on trunnions, a gear on each mold element, a rack adapted to mesh with each gear, a support for both of said racks, said support being removable toward and from the gears, means for removing each rack in one direction while in mesh with the gears, and in the other direction while out of mesh with the gears, whereby said mold element will be rotated intermittently.

41. In a casting machine, the combination of a pair of mold elements, means for removing one of said mold elements toward and from the other, said movable mold element having a gear thereon, a rack adapted to mesh with said gear, a support for said rack, means for moving said support into two positions, in one of which the rack meshes with the gear, and in the other of which it is out of mesh, and means for moving the rack in one direction while in mesh with the gear and in the other direction while out of mesh with the gear.

42. In a casting machine, the combination of a pair of mold elements, means for moving one of said mold elements toward and from the other, the said movable mold element being rotatable on an axis, a gear on said rotatable mold element, a rack adapted to mesh with said gear, means for moving said rack back with the mold element during one part of its motion away from the other mold element and for then arresting the motion of the rack to cause the mold element to be rotated through a part of a revolution, and for thereafter moving the rack along with the mold element to prevent the further rotation of the mold element.

43. In a casting machine, the combination of a pair of mold elements, means for moving one of said mold elements toward and from the other, the said movable mold element being rotatable on an axis, a gear on said rotatable mold element, a rack adapted to mesh with said gear, means for moving said rack back with the mold element during the first part of its motion away from the other mold element and for then arresting the motion of the rack to cause the mold element to be rotated through a part of a revolution, and for thereafter moving the rack along with the mold element to prevent the further rotation of the mold elements to the end of the stroke, and means for withdrawing the rack from mesh with the gear during the return stroke.

44. In a casting machine, the combination of a pair of mold elements, means for moving one of said mold elements toward and from the other, the said movable mold element being rotatable on an axis, a gear on said rotatable mold element, a rack adapted to mesh with said gear, means for moving said rack back with the mold element during part of its motion away from the other casting mold element and for then arresting the motion of the rack to cause the mold element to be rotated through a part of a revolution, and for thereafter moving the rack along with the mold element to prevent the further rotation of the mold element up to the end of the stroke, means for withdrawing the rack from mesh with the gear during the return stroke and returning the rack to its starting position as the gear and mold element move back, and means for bringing the rack back into mesh with the gear when at the opposite end of the stroke.

45. In a casting machine, the combination of a pair of mold elements, means for moving one of said mold elements toward and from the other, the said movable mold element being rotatable on an axis, a gear on said rotatable element, a rack adapted to mesh with said gear, means for moving said rack back with the mold element during part of its motion away from the other mold element and for then arresting the motion of the rack to cause the mold element to be rotated through a part of a revolution, and for thereafter moving the rack along with the movable mold element to prevent the further rotation thereof up to the end of the stroke, means for withdrawing the rack from mesh with the gear during the return stroke, and stationary guides for engaging the movable mold element to prevent its rotation while the rack moves along with it.

46. In a casting machine, the combination of a pair of mold elements, means for moving one of said mold elements toward and from the other, the said movable mold element being rotatable on an axis, a gear on said rotatable mold element, a rack adapted to mesh with said gear, means for moving said rack back with the mold element during part of its motion away from the other mold element and for then arresting the motion of the rack to cause the mold element to be rotated through a part of a revolution, and for thereafter moving the rack along with the mold element to prevent the further rotation of the mold element, and two sets of stationary guides for engaging the mold element, said guides being located in position to engage the mold element when it travels with the rack and without rotating, and having a space between them at the point at which the mold element rotates.

47. In a casting machine, the combination of a pair of mold elements, slides on which one of said mold elements is mounted, links connected with said slides, a shaft having an arm connected with said links, a gear or pinion on the shaft, an oscillating arm having a rack meshing with said gear or pinion, whereby the slides will be caused to reciprocate, and means for rotating said mold elements for a part of a rotation during the reciprocation of said slides.

48. In a casting machine, the combination of a pair of mold elements, slides on which one of said mold elements is mounted, links connected with said slides, a shaft having an arm connected with said links, a gear or pinion on the shaft, an oscillating arm having a rack meshing with said gear or pinion, whereby the slides will be caused to reciprocate.

49. In a casting machine, the combination of a pair of mold elements, slides on which one of said mold elements is mounted, a shaft means for operatively connecting said shaft with said slides, a gear or pinion on the shaft, an oscillating arm having a rack meshing with said gear or pinion, whereby the slides will be caused to reciprocate, and stationary guides for holding the mold element during a part of its reciprocation.

50. In a casting machine, the combination of a pair of mold elements, both mounted to rotate on parallel axes, one of said axes being stationary and the other reciprocable, and means for locking the mold element on the stationary axis when a casting is to be made.

51. In a machine of the character described, the combination of a melting pot having a nozzle, a pair of mold elements, means movable transversely to the surface of the nozzle for bringing the mold elements together in front of the nozzle, means for moving the nozzle up to the mold elements in position to discharge metal between them, means for moving one of the mold elements away from the other in a direction transverse to the direction of motion of the nozzle, means for turning both of said mold elements on axes parallel with the direction of motion of the nozzle after they are separated to move the matrix and cast plate away from each other, and means for supplying a new matrix to one of the mold elements before it is moved back into casting position.

52. In a machine of the character described, the combination of a melting pot having a nozzle, a pair of mold elements, means movable transversely to the surface of the nozzle for bringing the mold elements together in front of the nozzle, means for moving the nozzle up to the mold elements in position to discharge metal between them, means for moving one of the mold elements away from the other in a direction transverse to the direction of motion of the nozzle, means for turning both of said mold elements on axes parallel with the direction of motion of the nozzle after they are separated to move the matrix and cast plate away from each other, and means for discharging the matrix and cast plate away from each other, and means for discharging the matrix and cast plate from the two mold elements.

53. In a machine of the character described, the combination of a melting pot having a nozzle, a pair of mold elements, means movable transversely to the surface of the nozzle for bringing the mold elements together in front of the nozzle, means for moving the nozzle up to the mold elements in position to discharge metal between them, means for moving one of the mold elements away from the other in a direction transverse to the direction of motion of the nozzle, and means for turning both of said mold elements on axes parallel with the direction of motion of the nozzle after they are separated to move the matrix and cast plate away from each other.

54. In a machine of the character described, the combination of a melting pot having a nozzle, a pair of mold elements, means movable transversely to the surface of the nozzle for bringing the casting boxes together in front of the nozzle, means for moving the nozzle up to the mold elements in position to discharge metal between them, and means for moving one of the mold elements away from the other in a direction transverse to the direction of motion of the nozzle.

55. In a machine for casting stereotype printing plates, the combination of a pair of mold elements having a flat cavity between them for producing a stereotype plate, means for bringing said mold elements together with said cavity in vertical position, with a melting pot, a pump, and a nozzle for said pump having a vertical slot in the end thereof adapted to register with said vertical space.

56. In a stereotype printing plate casting machine, the combination with a casting box having a vertical space therein for casting the plate, of a melting pot having a vertical nozzle extending substantially the whole length of the cavity in the casting box.

In testimony whereof I have hereunto set my hand, in the presence of two subscribing witnesses.

HENRY A. WISE WOOD.

Witnesses:
WILHELMENA F. RHODE,
MABEL M. GLASSEY.